UNITED STATES PATENT OFFICE.

CARL PAAL, OF ERLANGEN, GERMANY, ASSIGNOR TO THE FIRM OF JOSEPH CROSFIELD & SONS LIMITED, OF BANK QUAY 1, WARRINGTON, ENGLAND.

PROCESS FOR THE REDUCTION OF FATS AND UNSATURATED FATTY ACIDS.

1,023,753.      Specification of Letters Patent.      Patented Apr. 16, 1912.

No Drawing.      Application filed November 15, 1911. Serial No. 660,448.

*To all whom it may concern:*

Be it known that I, CARL PAAL, chemist, a subject of the King of Bavaria and the German Emperor, residing at 14 Oestliche Stadtmauer street, Erlangen, Kingdom of Bavaria, German Empire, have invented a new and useful Improvement in Processes for the Reduction of Fats and Unsaturated Fatty Acids; and I do hereby declare the following to be a full, clear, and exact description of the same.

The reduction of fats and unsaturated fatty acids of animal and vegetable origin may be effected by allowing hydrogen to act on the fats or fatty acids in presence of platinum metals, or protohydroxid compounds of same, which have been deposited upon certain finely divided substances and act as catalyzers or carriers of hydrogen. It has now been ascertained that the reduction of the fats and fatty acids may also be effected by hydrogen in presence of solid salts of the platinum metals. Both the simple salts, such as palladium protochlorid ($PdCl_2$) platinum protochlorid ($PtCl_2$), platinum chlorid ($PtCl_4$), platinum hydrochlorid ($H_2PtCl_6$), platinum sulfate; and the double salts, for instance potassium chloroplatinate ($K_2PtCl_6$), copper platinochlorid, may be used. When the double salts are used, care must be taken that no anticatalytic substances, such for instance as lead, find their way into the reduction mixture. Use may be made of salts whose acid radicals or other constituents are themselves reduced by hydrogen, for example acid platinous oxalate. In all cases the method is simple; and it is distinguished from those in which the finely divided metals are used by the omission of the preparation of the finely divided platinum metals or their protohydroxids and of the deposition on special carriers.

The present method is therefore very simple and easy of performance: the salts in a crushed condition, preferably in the state of powder, are mixed with the fats or fatty acids to be hydrogenized; and hydrogen is allowed to act on this mixture, in suitable vessels and with stirring, at temperatures below 100° preferably under a pressure of several atmospheres. In a short time the solid reduction product of the fat or fatty acid will be obtained. All that is necessary to insure the action of the solid salts of the platinum metals is that they must be present in the solid form during the progress of the reaction. The salts may also be added to the fats in a dissolved condition (for example in aqueous solution), the solvent being evaporated before or at the beginning of the reduction process. A suspension of the solid salts may also be used. For example, the salts of the platinum metals may be triturated with the fat or oil that is to be reduced, or with another fat or oil, the mixture being then mixed with the fats or fatty acids to be reduced. Again, for example, a suspension of the salts in hydrocarbons, or mineral oil products, may be prepared, and this mixture be added to the substances that are to be reduced, in which case the suspensory medium may be eliminated during the process of reduction. A single salt of a platinum metal may be used, or several salts, and even several platinum-metals may be mixed together: and the salts may also be used in conjunction with the platinum-metals which have been deposited on carriers, devoid of anticatalytic action, such as copper, nickel carbon or magnesium carbonate. It is probable that, during the process, the salts of the platinum-metals are split up into metal and free acid, for example:

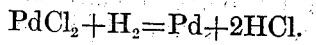
$$PdCl_2 + H_2 = Pd + 2HCl.$$

In any case, however the solid platinum-metal salts greatly facilitate the absorption of hydrogen by fats and fatty acids. Very small quantities of the platinum-metal salts are sufficient to reduce large quantities of fat or fatty acids in presence of hydrogen. When the reduction process is completed, the platinum metals or their compounds can be easily separated from the molten reduced fat or fatty acid by filtration, and used again—either directly or after conversion into the solid state—as catalytic agents for the reduction of fresh quantities of fat or fatty acid.

If it is desired to prevent the formation of free acid, as for example, hydrochloric acid from the chlorids of the platinum-metals, in the reducing process, all that is needed is to add to the powdered platinum-metal salts a neutralizing agent, such as anhydrous soda, in sufficient quantity to combine with the liberated acid. The addition of salts of the platinum metals assists the reduction process considerably more than is done by palladium black or platinum black containing an amount of platinum-metal equal to that in the platinum-metal salts added in the present method. Thus, for example, 1.7 parts of $PdCl_2$ (=1 part of Pd) in presence of hydrogen will convert 10,000 parts of fat or fatty acid into solid masses within 3 to 4 hours. If, however, the $PdCl_2$ be replaced by a quantity of palladium black containing the same amount of palladium, then, with a ratio of 1 part of Pd to 10,000 parts of fat or fatty acid, these substances will remain liquid, even when the palladium and hydrogen are allowed to act for twice or three times as long as in the experiment with $PdCl_2$. Under these experimental conditions no appreciable action takes place when an attempt is made to replace the palladium salt by palladium black.

In the present method, the time required for the reduction depends on the amount of the platinum-metal salt used, and on the pressure under which the hydrogen is allowed to act. By using a palladium salt as the hydrogen carrier, about 50,000 parts of fat or unsaturated fatty acid can be hydrogenized within from 6 to 8 hours with a quantity of salt, for example, $PdCl_2$, corresponding with 1 part of Pd.

Example: One million parts by weight of castor oil or oleic acid are treated with thirty-four parts by weight of dry palladium protochlorid (=20 parts of Pd) in the form of powder, with or without the equivalent amount of anhydrous soda; or with 140 parts by weight of dry platinum protochlorid (=100 parts of Pt) in the form of powder; or 172 parts of platinum chlorid; or 230 parts of platinum hydrochlorid, all with or without addition of equivalent amount of anhydrous soda. The mixture is placed in a pressure vessel, from which the air is exhausted as completely as possible, and hydrogen is then admitted into the vessel under a pressure of 2 to 3 atmospheres. The reduction mixture is preferably kept in motion, which can be effected by means of a stirring apparatus arranged in the pressure vessel. The vessel is heated to about 80° C. although the reduction may also be carried out at a lower temperature. The progress of the reduction that is to say the consumption of hydrogen, is revealed by the fall in pressure as indicated by the pressure gage. When the gage registers only a low pressure, a fresh quantity of hydrogen is admitted. The completion of the reduction process can be recognized by the gas pressure remaining constant for some considerable time. When the reduction is ended, the reduction produce is freed from the catalyzer in a filter press which is adapted to be heated.

I claim:

1. A method for the reduction of fats and unsaturated fatty acids which consists in causing hydrogen to act on these substances at temperatures below 100 degrees centigrade, in presence of small solid quantities of salts of the platinum metals.

2. A method for the reduction of fats and unsaturated fatty acids which consists in causing hydrogen to act on these substances at temperatures below 100 degrees centigrade, in presence of small solid quantities of salts of the platinum metals and solid neutralizing agents.

In testimony whereof, I have signed my name to this specification in the presence of two subscribing witnesses.

CARL PAAL.

Witnesses:
 Max Busin,
 Hermann Apitzsch.